United States Patent Office
3,068,979
Patented Dec. 18, 1962

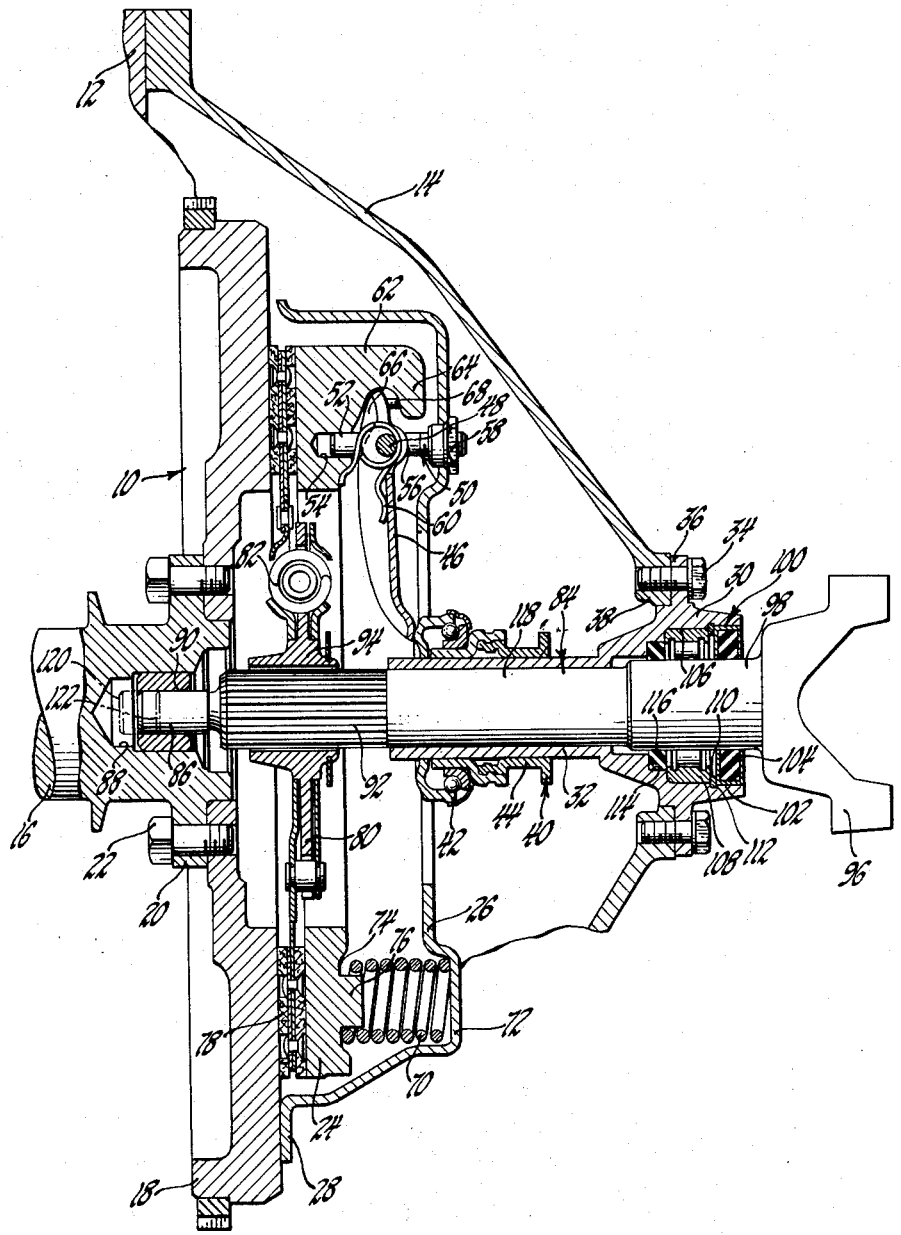

3,068,979
PROPELLER SHAFT SLIP JOINT
Zora Arkus-Duntov, Grosse Pointe, Mich., assignor to General Motors Corporation, Detroit, Mich., a corporation of Delaware
Filed Jan. 25, 1960, Ser. No. 4,555
1 Claim. (Cl. 192—110)

This invention relates to a means for allowing axial movement of a propeller shaft in a motor vehicle and more particularly to such means provided at the motor vehicle clutch assembly.

In motor vehicle constructions, it is necessary to provide some means in the driveline for taking up the effective changes in length of the propeller shaft due to the rise and fall of the rear axle. As the rear axle changes its height from the ground, due to road irregularities, the driveline, which is rigidly connected thereto, must lengthen and shorten between the rear axle and the front end of the vehicle.

In the past, the provisions for changes in the effective length of the driveline have been cumbersome and expensive. This is because a separate joint is generally utilized somewhere in the propeller shaft, or one of the usual propeller shaft universal joints serves a second function in allowing for changes in effective length.

The device in which this invention is embodied comprises, generally, a clutch assembly adjacent the rearward end of a motor vehicle engine, the clutch assembly having means provided therein to allow for axial movement of the propeller shaft relative thereto. This construction is particularly useful in a vehicle employing a transaxle type of construction, that is, where the vehicle transmission is located at the rear of the vehicle and as a part of the axle.

With a construction of this nature, the extra part generally required is thereby eliminated, providing a considerable economic advantage in the production of the motor vehicle. In eliminating the extra slip joint, the cost thereof is also eliminated, as is the cost involved in production and assembly of such a part. A further advantage is in the increase of available power transmitted from the engine to the rear axle due to the elimination of the slip joint. Any joint in a propeller shaft or driveline causes a certain amount of power loss which is objectionable to both the manufacturer and the user.

These and other advantages will become more apparent from the following description and drawings, in which the single figure is a cross-sectional view through a motor vehicle clutch assembly illustrating the position of the propeller shaft and its supports within the clutch assembly.

Referring more particularly to the drawing, a motor vehicle clutch assembly, illustrated generally by the numeral 10, is suitably secured to a vehicle engine 12 such that the clutch housing 14 extends rearwardly of the engine and toward the rear axle. The engine includes a crankshaft 16 which is driven in the conventional manner by the engine pistons.

Secured to the rearward end of the crankshaft 16 is a flywheel 18, secured to a flange 20 formed on the crankshaft 16 as by bolts 22. A pressure plate 24 in the clutch assembly 10 is located adjacent the flywheel 18 and serves to transmit the driving torque in the usual manner. A pressure plate cover 26 surrounds the pressure plate 24 and is disposed within the clutch housing 14. The pressure plate cover 26 is secured to the flywheel 18 in any suitable manner, as by welding or bolting the flange 28 at suitable intervals around the circumference thereof.

Secured in the rearward end of the clutch housing 14 is a bearing assembly housing 30 having an axially extending sleeve 32 integrally formed therefrom. The bearing housing 30 may be secured to the clutch housing in any suitable manner, as by a plurality of bolts 34 extending through a flange 36 formed on the housing 30. The bolts 34 are received in an annular ring 38 which is an integral portion of the clutch housing 14.

Mounted around the sleeve 32 is a throw-out bearing assembly, illustrated generally by the numeral 40. The assembly includes a ball bearing unit 42 and a channel member 44 which receives a conventional clutch yoke. The throw-out bearing assembly 40 is movable in an axial direction along the sleeve 32 and actuates the clutch release levers 46 which are secured in the pressure plate 24.

The release lever 46 is pivotally mounted on a pin 48 which in turn is received in an eye-bolt 50. The left-hand end of the eye-bolt 52, as viewed in the drawing, is slidably received in a bore 54 formed in the pressure plate 24. The right-hand end 56 of the eye-bolt 50 is threadedly received in an adjusting nut 58 which in turn is secured in the pressure plate cover 26. The eye-bolt 50 is thus movable in an axial direction to change the distance of the pivot pin 48 with respect to the pressure plate and the pressure plate cover, for proper adjustment thereof and for proper operation of the throw-out bearing assembly 40. In order to keep the lower end of the release lever 46 in contact with the throw-out bearing assembly 40, a torsion spring 60 is received about the pivot pin 48 and is biased between the release lever 46 and the pressure plate 24.

Adjacent the release lever mounting assembly on the pressure plate 24 is a lug 62 having a hook-like portion 64 within which is received an extension 66 formed from the release lever 46. A strut member 68 is disposed between the extension 66 and the hook-like portion of the lug 62 such that when the release lever is rotated in a clockwise direction about the pivot pin 48 the lug 62 and pressure plate 24 will be moved to the right, as viewed in the drawing. This movement separates the pressure plate 24 from the flywheel 18 and allows the flywheel to rotate without rotation of the pressure plate.

In order to bias the pressure plate in a direction toward the flywheel 18, a plurality of coil springs 70 are disposed at spaced points around the surface of the pressure plate. The coil springs are seated in depressions 72 formed in the pressure plate cover 26 and in annular grooves 74 formed in the surface of the pressure plate 24. A cylindrical land 76 extending outwardly from the pressure plate and within the annular groove 74 locates the spring 70 in its proper position.

The usual friction discs 78 are disposed between the pressure plate 24 and the flywheel 18 such that when the two parts are forced together the friction discs 78 will rotate together, thus driving the clutch driven plate 80 in the usual manner. A plurality of coil springs 82 serve to dampen vibrations and to take up excessive relative movement between the friction discs 78 and the driven plate 80.

The vehicle propeller shaft, a portion of which is illustrated generally by the numeral 84, extends between the crankshaft 16 and the motor vehicle rear axle (not shown). The forward end of the propeller shaft includes a pilot portion 86 which is received in an aperture 88 formed in the rearward end of the crankshaft 16. A bearing 90, also disposed in the opening 88, receives the pilot portion 86 of the propeller shaft and permits both rotational and axial movement thereof.

Adjacent the pilot portion 86 of the propeller shaft is an externally splined portion 92 which is received in an internally splined hub 94 of the clutch driven plate 80. The spline connection is such that the propeller shaft is axially movable with respect to the hub 94.

The opposite end of the propeller shaft 84 may comprise a universal joint yoke 96, to which is secured the remainder of the propeller shaft, although it would not be necessary to include a universal joint at this particular point on the driveline.

A cylindrical portion 98 of the propeller shaft 84 is supported in the bearing housing 30 by a roller bearing and seal assembly, illustrated generally by the numeral 100. A stepped aperture is formed in the bearing housing 30, the first step, illustrated by numeral 102, receiving a sealing member 104 which prevents the entry of dirt and foreign material to the bearing assembly 100. The second step 106 receives the outer race 108 of the bearing assembly 100, the outer race being secured therein by a retaining ring 110 seated in a suitable annular groove 112 in the bearing housing 30. Step 114 receives a second seal member 116 which prevents the entry of foreign material to the bearing from inside the clutch assembly. The bearing and seal unit located in the bearing housing 30 allows both rotational and axial movement of the propeller shaft portion 84 during normal operation of the motor vehicle.

The central portion 118 of the propeller shaft 84 is received and rotates within the sleeve 32 extending from the bearing housing 30.

The limits of axial movement allowed the propeller shaft are illustrated by the dashed and dotted lines 120 and 122 at the pilot portion 86 of the propeller shaft section 84. Dashed and dotted lines 120 indicate the extreme inward travel of the propeller shaft, that is, to the left as viewed in the drawing, and dashed and dotted lines 122 indicate the extreme outward position of the pilot portion 86. This same extent of movement is allowed in the spline connection between the propeller shaft section and the clutch driven plate hub, and through the bearing and seal unit 116—100—104.

Thus, it may be seen that a propeller shaft slip joint is provided in the clutch assembly of a motor vehicle which eliminates the external extra joint generally utilized in motor vehicle constructions. Numerous advantages are obtained by the use of a slip joint in this position, including a greater economy for both the manufacturer and the user and ease in manufacture and assembly of the motor vehicle.

What is claimed:

In a motor vehicle having an engine and a clutch assembly and a propeller shaft, a crankshaft in said engine having an opening formed in the rearward end thereof, a bearing received in said opening, a pilot portion formed on the forward end of said propeller shaft and slidably received in said bearing, an externally splined portion formed on said propeller shaft and adjacent said pilot portion, a driven plate in said clutch assembly adjacent said rearward end of said crankshaft and axially spaced therefrom, an internal spline formed in said driven plate and slidably receiving said externally splined portion of the said propeller shaft, a clutch housing for said clutch assembly secured to said engine and extending rearwardly thereof, a bearing housing secured to the rearward end of said clutch housing and axially aligned with said crankshaft and said driven plate, a bearing and seal assembly received in said bearing housing and receiving said propeller shaft and permitting relative axial movement between said propeller shaft and said driven plate and said crankshaft to allow for changes in the effective length of said propeller shaft during normal operation of said motor vehicle.

References Cited in the file of this patent

UNITED STATES PATENTS

| | | |
|---|---|---|
| 1,538,034 | Frey | May 19, 1925 |
| 2,057,744 | Sanford | Oct. 20, 1936 |
| 2,090,397 | Haupt | Aug. 17, 1937 |

FOREIGN PATENTS

| | | |
|---|---|---|
| 20,356 | Great Britain | Sept. 21, 1904 |